(12) United States Patent
Patel et al.

(10) Patent No.: US 12,135,604 B2
(45) Date of Patent: Nov. 5, 2024

(54) SYSTEMS AND METHODS FOR PROACTIVE SERVICE HEALTH DETECTION

(71) Applicant: Cox Communications, Inc., Atlanta, GA (US)

(72) Inventors: Jignesh Patel, Atlanta, GA (US); Ron Lev, Atlanta, GA (US); Kenny Chau, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 131 days.

(21) Appl. No.: 17/662,362

(22) Filed: May 6, 2022

(65) Prior Publication Data

US 2023/0359543 A1    Nov. 9, 2023

(51) Int. Cl.
*G06F 11/07* (2006.01)
*G06F 11/36* (2006.01)

(52) U.S. Cl.
CPC ........ *G06F 11/079* (2013.01); *G06F 11/0706* (2013.01); *G06F 11/0769* (2013.01); *G06F 11/366* (2013.01)

(58) Field of Classification Search
CPC ............ G06F 11/0706; G06F 11/0769; G06F 11/079; G06F 11/0793; G06F 11/366
See application file for complete search history.

(56) References Cited

U.S. PATENT DOCUMENTS

| | | | |
|---|---|---|---|
| 9,652,316 B2 * | 5/2017 | Gamage | G06F 11/0709 |
| 2018/0293125 A1 * | 10/2018 | Lavid Ben Lulu | G05B 23/024 |
| 2022/0179730 A1 * | 6/2022 | Chan | G06F 11/0787 |
| 2022/0308952 A1 * | 9/2022 | Ni | G06F 40/30 |

FOREIGN PATENT DOCUMENTS

WO    WO-2021243342 A1 * 12/2021

* cited by examiner

*Primary Examiner* — Joseph R Kudirka
(74) *Attorney, Agent, or Firm* — Eversheds Sutherland (US) LLP

(57) ABSTRACT

Disclosed are systems and methods for proactive service health detection. An example method may include receiving, by a first computing system, first data associated with a first application at a first time and second data associated with the first application at a second time. The example method may also include receiving an indication of an anomaly associated with the first application at the second time. The example method may also include comparing, by a first natural language processing model on the first computing system, the second data and the first data. The example method may also include determining, by the first natural language processing model and based on the comparison, a first difference indicative that a portion of the first data is different than a same portion of the second data. The example method may also include receiving third data associated with the first application. The example method may also include determining, by the first natural language processing model, that the first difference exists in the third data. The example method may also include automatically initiating a first action to prevent or mitigate a second anomaly associated with the first application.

17 Claims, 8 Drawing Sheets

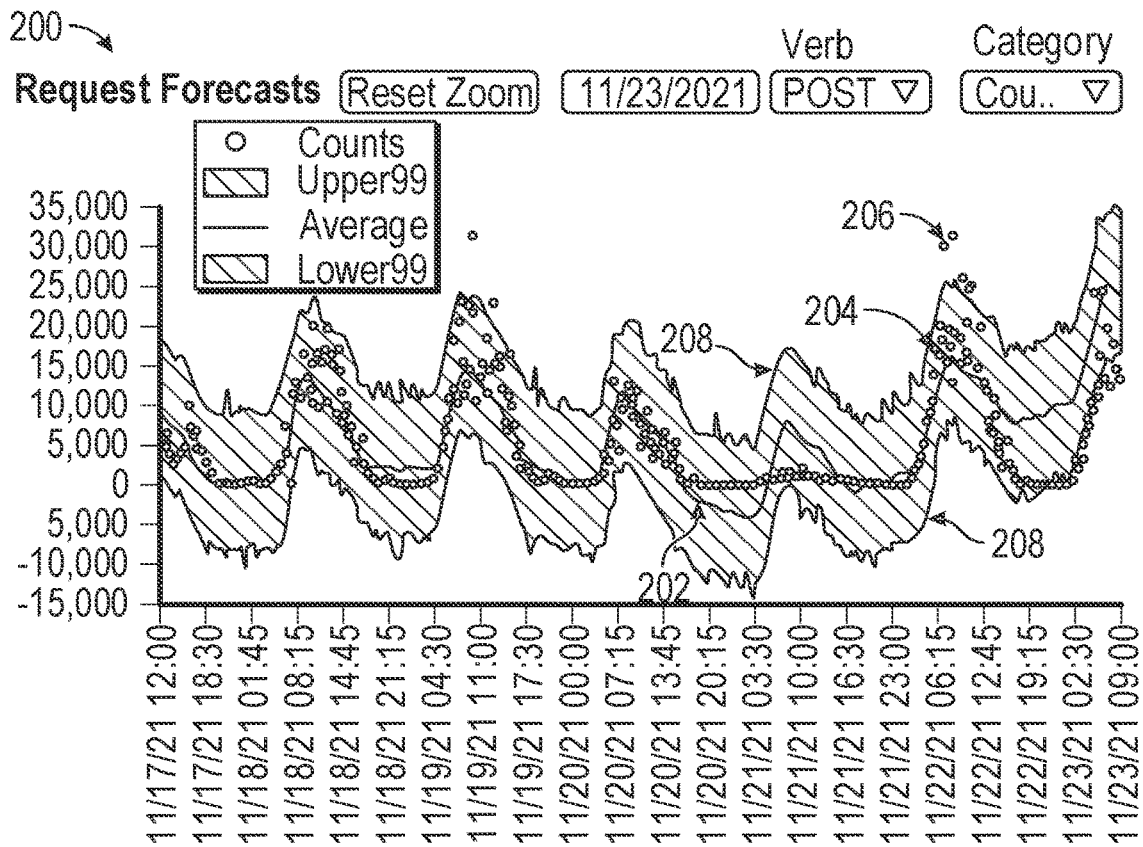
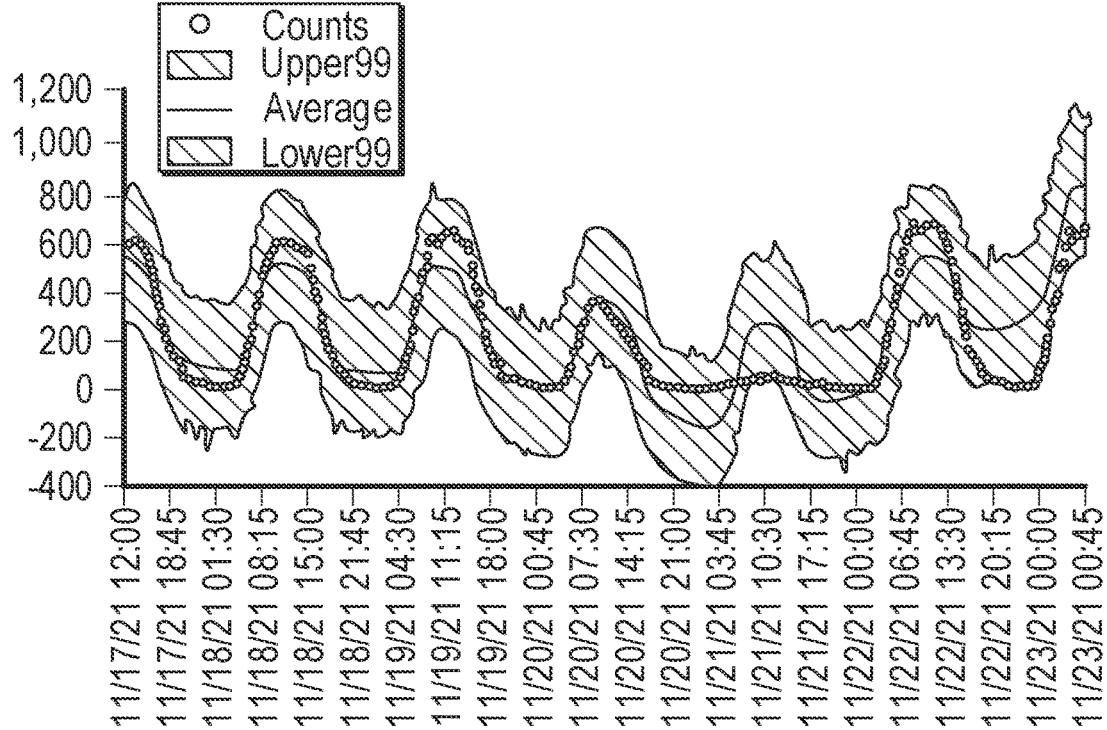
FIG. 2

SYSTEMS AND METHODS FOR PROACTIVE SERVICE HEALTH DETECTION

BACKGROUND

Modern applications are transitioning from a traditional infrastructure of separate, static physical systems to a dynamic mixture of on-premises, managed cloud, private cloud, and public cloud environments, which may be running on virtualized or software-defined resources that scale and reconfigure constantly. Given this, the task of finding causality and performing triaging to remedy a problem associated with an application and/or micro-service associated with the application becomes more challenging because of the inability to intelligently sort the significant events and correlate data across different but interdependent environments.

BRIEF DESCRIPTION OF THE DRAWINGS

FIG. 2 is an example visualization, in accordance with one or more embodiments of the disclosure.

Figure 1:
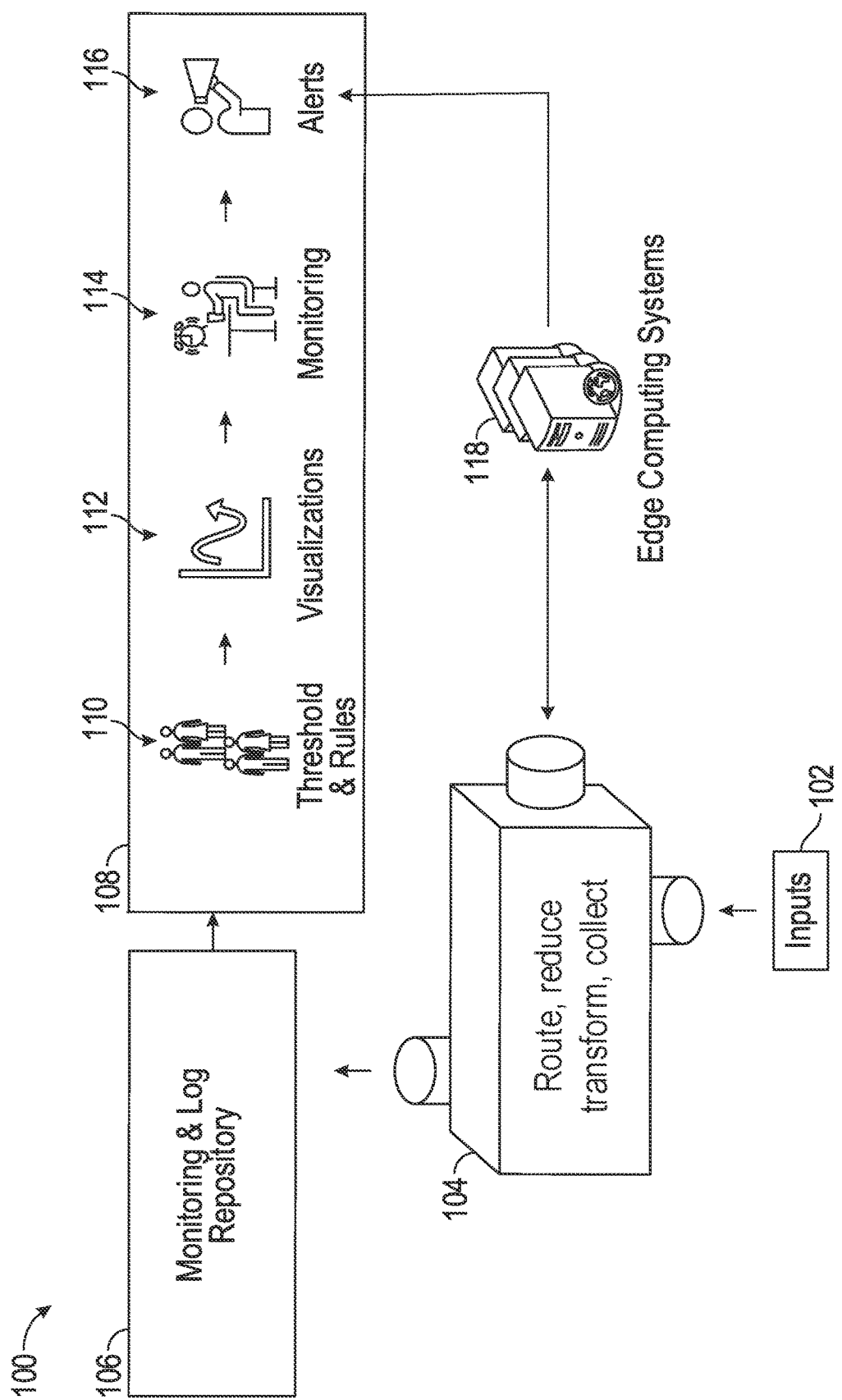
FIG. 1 is an example flow diagram, in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar but not necessarily the same or identical components; different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

This disclosure relates to, among other things, systems, and methods for proactive service health detection. Oftentimes, organizations may use enterprise applications that may be used for a variety of different purposes. An application may generally refer to a system that may integrate core business processes (e.g., sales, human resources, accounting, etc.) of an enterprise's operations to facilitate cooperation and coordination of work across the enterprise. Given the scale of these applications, an application may also comprise one or more micro-services. A microservice may be a self-contained module that may fulfill a specific functionality. A microservice may expose an application programming interface (API) that may be consumed by other microservices or by the application's clients, such as third-party integrations with payment gateways and logistics. For example, an application used by an internet service provider (ISP) may include a payment gateway microservice that may facilitate any payment processing for users. A second example of a micro-service may include a recommendation engine. The recommendation engine may generate recommendations for additional services that may benefit a user (for example, the recommendation engine may determine that the user plays video games and thus may benefit from a low-latency network service). This is just one nonlimiting example of an application and types of microservices that may comprise the application, and any other types of applications and micro-services associated with those applications may also be applicable. Additionally, the systems and methods described herein may also apply to any other type of application as well.

In some systems, the health (for example, the performance, occurrence of anomalies, etc.) of these various applications and/or micro-services may be monitored by establishing one or more thresholds that may be used as points of comparison for data that are being acquired from the applications and/or micro-services. If these thresholds are surpassed, then an alert may be triggered to provide an indication that an application and/or one or more microservices of the application are experiencing an anomaly. For example, a threshold may be established to provide an alert if the CPU usage has increased more than 90%. As a second example, a threshold may be established to provide an alert if a predetermined number of users are unable to access a website. As a third example, a threshold may be established to provide an alert if a response time from a micro-service surpasses a predefined value. As a fourth example, a threshold may be established to provide an alert if memory associated with an application is above a predefined usage value. These are merely nonlimiting examples of different types of alerts that may be used and any other types of alerts may also be applicable as well. In this manner, an operator may be alerted as to an anomaly that exists with any applications and/or micro-services associated with those applications.

However, there may be some disadvantages associated with this aforementioned approach for identifying problems with an application or micro-service of the application. For instance, modern applications are transitioning from a traditional infrastructure of separate, static physical systems to a dynamic mixture of on-premises, managed cloud, private cloud, and public cloud environments, running on virtualized or software-defined resources that scale and reconfigure constantly. Given this, the task of finding causality and performing triaging to remedy a problem associated with an application and/or micro-service becomes more challenging because of the inability to intelligently sort the significant events and correlate data across different but interdependent environments. Additionally, even if such processing is capable of being performed, the processing may be performed inefficiently. Therefore, real-time insight and predictive analysis of operations needed to respond to problems in a sufficient time frame may be problematic with these aforementioned approaches.

At a high level, the systems and methods described herein may improve upon the aforementioned approach to provide automated, self-learning, and proactive detection of anomalies that may occur with respect to any applications and/or micro-services. The systems and methods may also automatically eliminate or prevent these anomalies. This proactive health detection may involve a number of associated steps. A first step may include collecting and aggregating volumes of operational data generated by the applications and/or micro-services (for example, one or more "logs" as described below). A second step may involve algorithmically filtering noise from the data to identify significant events and patterns related to system performance and availability. A third step may involve applying a natural language processing model (for example, a specific type of artificial intelligence) to analyze any remaining data. A fourth step may include automatically initiating an action to resolve any current and/or potential future issues with an application and/or any micro-services associated with the application. Additional details relating to these high-level steps are provided below.

With respect to the systems and methods described herein, some or all of the applications and/or micro-services associated with the applications may generate logs that include data relating to any operations that occur with respect to the applications and/or any other types of data. In some cases, the logs may not be generated by the applications and/or micro-services themselves but rather may be generated by a system on which the applications and/or micro-services are running and/or a system that is accessing the applications and/or micro-services. The information included within these logs may be formatted in accordance with natural language (for example, the information may be in English or any other language or combination of languages). In some cases, there may be two different types of such logs (however, any other number of different types of logs, including any other types of data, may also be applicable). A first type of log may include an access log. The access log may include information relating to identifying users or systems that are accessing the application, as well as other types of information relating to the access. Examples of such information may include a time at which the application was accessed, processing time, a response code that was provided by the application to the user or system, and/or any other types of relevant information. A second type of log may include a developer log. These types of logs may not be standardized or structured, as is the case with the access logs. These logs may be specific to a particular application and may include information relating to transactions or activities taking place in association with the application. These logs may also include any other types of information as well. However, the information within these logs is often also formatted in accordance with natural language.

Oftentimes, the applications associated with these logs may often be hosted on clusters of computing systems (for example, servers or any other type of computing system) rather than a single computing system. Given this, the logs may need to be collected from these various computing systems and stored within a centralized repository (for example, database 340 and/or any other storage location on any computing system or combination of computing systems, such as one or more servers). Additionally, given that different types of logs associated with the same application and/or micro-services may originate from different computing systems, along with the fact that a large volume of logs associated with different time frames may be received, the different logs may need to be grouped together to ensure that logs associated with the same time frame and the same application and/or microservice are considered together. Such groupings, for example, may be accomplished by grouping logs with similar time stamps. This may ensure that a log from one point in time is not considered along with a log from a different point in time. Logs may also be grouped in any other manner as well. For example, the grouping may be performed by request type, URL, response type, and/or based on any other type of parameter.

In one or more embodiments, once the logs are collected and categorized, they may then be used for the analysis of an application and/or micro-service that is experiencing an anomaly. That is, when an anomaly is identified in association with a particular application and/or micro-service, any logs associated with that application and/or micro-service at the time the anomaly was identified may be analyzed and compared to historical logs associated with the proper operation of the application and/or aspect of the application. To facilitate this, the repository may maintain historical logs for a given period of time (for example, the repository may store logs for a period of years to ensure a historical log is available as a reference point for comparison with any logs associated with an identified problem.

In one or more embodiments, this analysis may automatically be facilitated using an artificial intelligence model, such as a natural language processing model (however, any other type of model may also be used as well). The natural language processing model may be beneficial in the analysis of these logs because the information included within the logs may often be formatted in accordance with a natural language. Given this, the natural language processing model may be the most effective type of artificial intelligence model for identifying distinctions between the historical logs and the logs associated with the time at which the problem was identified.

In some cases, the natural language processing model may extract any language included in the historical logs, may also extract any language included in the logs associated with the time at which the problem was identified (or may simply receive the information), and may analyze the information within the logs to identify a causality for the particular type of problem that was identified. For example, the causality may be based on an identified distinction between the information in the historical logs and the information in the logs associated with the time at which the problem was identified. As a few non-limiting examples, the natural language processing model may determine if there are distinctions between response codes, an amount of data that was transmitted, a processing time of the data, and/or any other types of data. This determined causality may allow the natural language processing model to automatically perform self-training as the model builds patterns associated with the analyzed logs.

In one or more embodiments, the patterns built by the natural language processing model may then be used to proactively identify any potential future problems that may occur with respect to the same types of applications and/or aspects of the applications. For example, if the natural language processing model previously identified a pattern that a particular response code included in a log associated with a payment processing application resulted in the payment not properly being processed, and then the natural language processing model identifies this response code in a log for this application, then the model may automatically initiate proactive action(s) to prevent or mitigate the problem. The patterns may also be used to allow the natural language processing model to quickly identify an existing problem in real-time as well (for example, in a matter of microseconds or milliseconds).

In one or more embodiments, any number of different types of actions may automatically be initiated by the system once an anomaly is identified or predicted. As a first example, an alert may be generated that may be presented to a user on a user interface. As a second example, if a user login is failing, then a shutdown and restart command may automatically be transmitted to an application server. As a third example, if a particular micro-service associated with an application is failing, then an additional container may be added to increase the capacity associated with that particular micro-service in real time. A container may be the lowest level of a micro-service, which holds the running application, libraries, and their dependencies. Adding additional containers may include adding more application resources in case of higher load based on the "container image" defined. A container image may be a ready-to-run software package, including everything needed to run an application: the code and any runtime it requires, application and system libraries, and default values for any essential settings.

In one or more embodiments, the natural language processing model may be stored on a centralized computing system (for example, a centralized computing system 330 and/or any other computing system, such as a server). This centralized natural language processing model may be the model that is trained based on historical logs associated with any of the applications being analyzed. The system may also include one or more edge computing systems (for example, the one or more edge computing systems described with respect to FIG. 3). The use of these multiple edge computing systems may provide the benefit of improved efficiency in data processing, as logs may be processed in parallel amongst the various edge compute systems rather than waiting for one system to process logs serially. In some cases, the centralized computing system may be one of the edge computing systems. These edge computing systems may include copies of the natural language processing model stored in the centralized computing system. In this manner, the model may be trained on the centralized computing system, and then any updates to the model may be propagated to the copies of the model on the edge computing systems. This may ensure that the models stored on the edge computing systems are also trained in a similar manner as the model stored on the centralized computing system. The various models may also be maintained in any other manner as well. For example, the overall system may simply include a collection of edge computing systems that share a distributed ledger, including any of the relevant information.

The systems and methods described herein may improve upon the prior approach by providing visibility into performance data and dependencies across all environments, analyzing data to extract significant events related to slowdowns or outages, may automatically alert operators as to any problem and their root causes, and/or may automatically initiate actions within a system to mitigate or eliminate such actions as they occur or proactively before they occur. The systems and methods may allow real-time determinations to be made in a matter of microseconds or milliseconds.

Turning to the figures, FIG. 1 is an example flow diagram 100, in accordance with one or more embodiments of the disclosure. Particularly, the flow diagram 100 may illustrate one example approach for monitoring data and producing alerts based on the data in addition to a second approach based on the system and methods described herein (for example, a different approach involving the use of one or more edge computing systems including natural language processing models).

Figure 3:
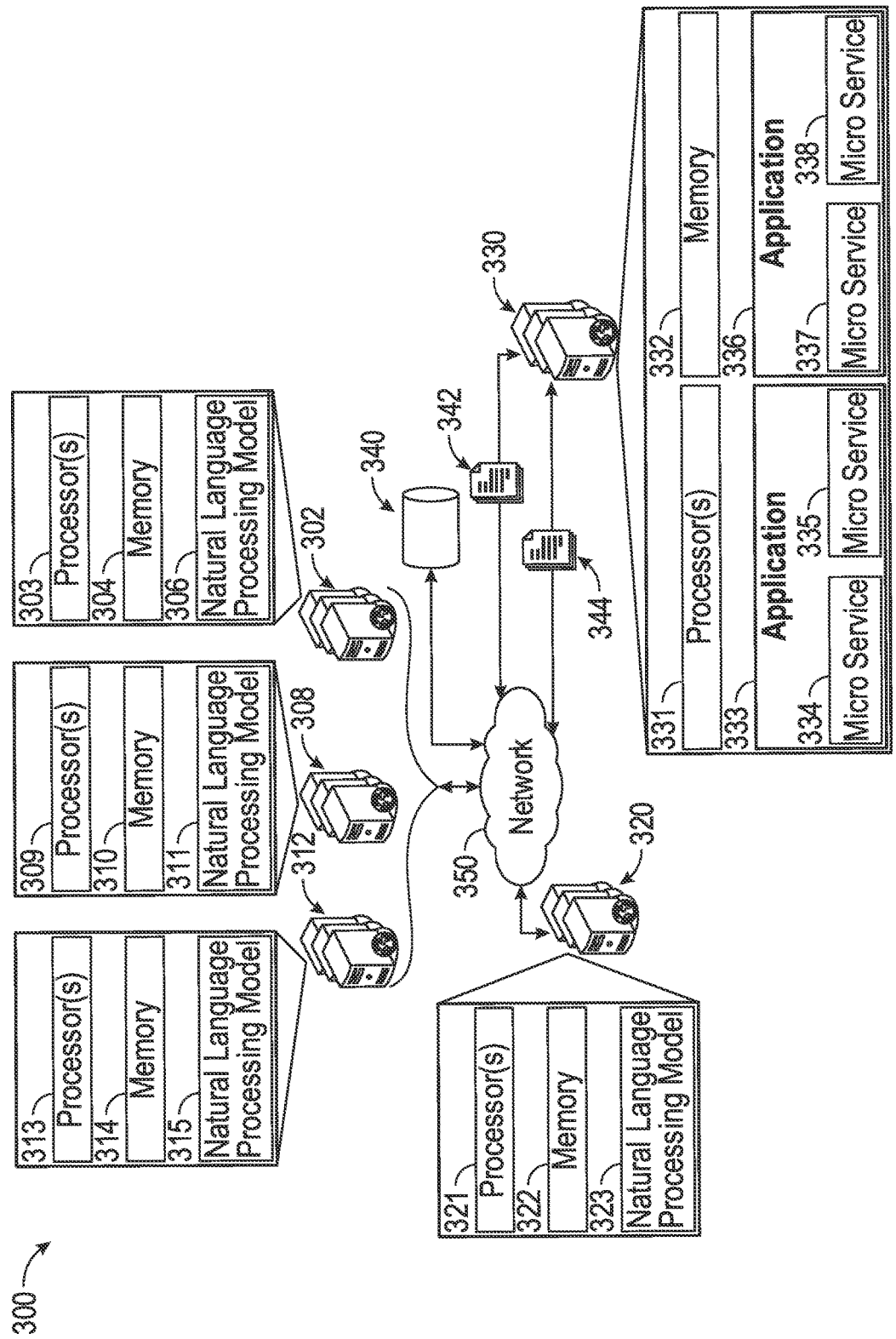
FIG. 3 is an example system, in accordance with one or more examples of the disclosure.

The first approach may involve prior methods for data collection and processing without the use of one or more edge computing systems 118 including natural language processing models (these may be described in additional detail with respect to at least FIG. 3). In this first approach, the health (for example, the performance, occurrence of anomalies, etc.) of various applications and/or micro-services may be monitored by establishing one or more thresholds (shown as operation 110) that may be used as points of comparison for data that is being acquired from the applications and/or micro-services. If these thresholds are surpassed, then an alert (shown as operation 116) may be triggered to provide an indication that an application and/or one or more micro-services of the application is experiencing an anomaly. The determination that the thresholds are surpassed may be made during a monitoring process (shown as operation 114). The monitoring process may also involve producing visualizations of data (shown as operation 112 and further exemplified in FIG. 2).

In one or more embodiments, and in contrast with the first approach described above, the second approach may include an improved approach to identifying current and/or future problems with an application or micro-service. In this second approach, any logs acquired by the central repository 106 may be analyzed by any of the natural language processing models on the one or more edge computing systems 118 to proactively identify potential problems.

In one or more embodiments, the second approach may initiate with receiving one or more inputs 102. The one or more inputs 102 may include, for example, one or more logs, including data relating to one or more systems of records and/or enterprise applications as described above. Some or all of the applications (and/or micro-services associated with the applications) may generate logs that include information relating to any operations that occur with respect to the applications. The information included within these logs may be formatted in accordance with a natural language (for example, the information may be in English or any other language or combination of languages). As aforementioned, there may be a number of different types of logs that may be received (for example, the access log, develop log, and/or any other type of log, including any type of data relating to an application and/or micro-service). Additionally, the logs may be collected from various computing systems and stored within a central repository 106 (for example, database 340 and/or any other storage system) rather than all of the logs being collected from a single computing system. A collection system 104 may perform the collection of logs from the edge computing systems 118 and/or any other source of logs. The collection system 104 may also perform any other types of functionalities, such as transforming the logs, filtering the logs, routing the logs to a central repository 106, etc. Given that different types of logs associated with the same application and/or micro-services may originate from different computing systems, along with the fact that a large volume of logs associated with different time frames may be received, the different logs may need to be grouped together to ensure that logs associated with the same time frame and the same application and/or microservice are considered together. Such groupings, for example, may be performed by grouping logs with similar time stamps. However, the grouping may be performed in any other manner as well.

Once the logs are collected, they may be provided to the central repository 106 for storage. The one or more logs may be used for analysis of an application and/or micro-service that is experiencing a problem. That is, when an anomaly is identified and associated with a particular application and/or aspect of an application, any logs associated with that application and/or aspect of the application at the time the anomaly was identified may be analyzed and compared to historical logs associated with proper operation of the application and/or aspect of the application. To facilitate this, the repository may maintain historical logs for a given period of time (for example, the repository 106 may store logs for a period of years to ensure a historical log is available as a reference point for comparison with any logs associated with an identified anomaly.

As the logs are collected, grouped, and stored, the data included within the logs may be analyzed to identify anomalies with an application or micro-service. In one or more embodiments, the natural language processing models may also be trained periodically or in real-time based on data included in the one or more logs. Particularly, a natural language processing model may be hosted on a centralized system (for example, centralized computing system 320 in FIG. 3). This centralized natural language processing model may receive logs associated with a time at which an anomaly is identified in association with any applications and/or micro-services. These logs may be compared to historical logs associated with the proper operation of the application and/or aspect of the application. To facilitate this, the repository may maintain historical logs for a given period of time (for example, the repository may store logs for a period of years to ensure a historical log is available as a reference point for comparison with any logs associated with an identified problem. The natural language processing model may extract any language included in the historical logs, may also extract any language included in the logs associated with the time at which the problem was identified, and may analyze the information within the logs to identify a causality for the particular type of problem that was identified. For example, the causality may be based on an identified distinction between the information in the historical logs and the information in the logs associated with the time at which the problem was identified.

In one or more embodiments, any updates to the centralized natural language processing model may be propagated to the copies of the model on the edge computing systems. This may ensure that the models stored on the edge computing systems are also trained in a similar manner as the model stored on the centralized computing system. The various models may also be maintained in any other manner as well. For example, the overall system may simply include a collection of edge computing systems that share a distributed ledger, including any of the relevant information.

FIG. 2 is an example visualization 200, in accordance with one or more embodiments of the disclosure. The visualization 200 may include a visual representation of data associated with an application and/or micro-service that may be monitored to identify a potential anomaly. For example, the visualization 200 may include one or more data appoints (for example, data point 204, data point 206, and/or any other number of data points depicted in the figure). The visualization 200 may also include a baseline 202 and/or one or more thresholds 208.

In one or more embodiments, the traditional methods, as aforementioned, may simply involve determining when data points surpass a pre-defined threshold. In contrast, the systems and methods described herein may instead involve the use of a natural language processing model that may be used in addition to, or in association with these traditional methods. For example, if a threshold is determined to be surpassed (which may be an indicator of an anomaly, the natural language processing model may then be used to analyze any associated logs to determine if any anomaly exists. Alternatively, the natural language processing model may be used to proactively identify potential anomalies before a given threshold is surpassed by analyzing any collected logs as described herein.

FIG. 3 is an example system 300, in accordance with one or more examples of the disclosure.

In one or more embodiments, the system 300 may include at least one or more edge computing systems (for example, edge computing system 302, edge computing system 308, edge computing system 312, and/or any other number of edge computing systems), a centralized computing system 320, an application computing system 330, and/or a database 340.

In one or more embodiments, the one or more edge computing systems may include one or more natural language processing models (for example, natural language processing model 306, natural language processing model 311, natural language processing model 315, and/or any other number of natural language processing models). Any of the natural language processing models may be trained to receive any of the logs (for example, log 342, log 344, and/or any other number of logs) received from the application computing system 330 to proactively (or in real-time) identify any anomalies associated with any of the applications (for example, application 333, application 336, and/or any other applications) and/or any of the micro-services (for example, micro-service 334, micro-service 335, micro-service 337, micro-service 338, and/or any other micro-service) associated with the application computing system 330

The one or more edge computing systems may also include at least one or more processor(s) (for example, processor(s) 303, processor(s) 309, processor(s) 313, and/or any other number of processor(s), memory (for example, memory 304, memory 310, memory 314, and/or any other memory). The one or more edge computing systems may also include any other elements, such as described with respect to the computing element 700 of FIG. 7).

In one or more embodiments, the centralized computing system 320 may store a centralized version of the natural language processing model. This centralized natural language processing model 323 may be the model that is trained based on historical logs associated with any of the applications being analyzed. The centralized natural language processing model 323 may be trained on the centralized computing system 320, and then any updates to the model may be propagated to the copies of the model on the edge computing systems. This may ensure that the models stored on the edge computing systems are also trained in a similar manner as the model stored on the centralized computing system 320. The various models may also be maintained in any other manner as well. For example, the overall system may simply include a collection of edge computing systems that share a distributed ledger, including any of the relevant information.

The one or more centralized computing system 320 may also include at least one or more processor(s) (for example, processor(s) 321, and/or any other number of processor(s), memory (for example, memory 322, and/or any other memory). The one or more edge computing systems may also include any other elements, such as described with respect to the computing element 700 of FIG. 7). Additionally, in some cases, the centralized computing system 320 may comprise one of the edge computing systems as well.

In one or more embodiments, the application computing system 330 may include a system on which any applications (for example, application 333, application 336, and/or any other applications) and/or any micro-services associated with the applications (for example, micro-service 334, micro-service 335, micro-service 337, micro-service 338, and/or any other micro-service) are hosted and/or simply used (for example, the applications and/or micro-services may be hosted on a remote system that may be accessed by the application computing system 330. For example, the application computing system 330 may be associated with an organization that may utilize the applications for various purposes. For example, for an application used by an internet service provider (ISP), a first micro-service associated with the application may include a payment gateway that may facilitate any payment processing for users. A second example micro-service may include a recommendation engine. The recommendation engine may generate recommendations for additional services that may benefit a user (for example, the recommendation engine may determine that the user plays video games and thus may benefit from a low-latency network service).

The one or more application computing system 330 may also include at least one or more processor(s) (for example, processor(s) 331, and/or any other number of processor(s), memory (for example, memory 332, any/or any other memory). The one or more edge computing systems may also include any other elements, such as described with respect to the computing element 500 of FIG. 7). Additionally, in some cases, the application computing system 330 may comprise one of the edge computing systems as well.

In one or more embodiments, the database 340 (which may be the centralized repository as described herein) may store any logs (for example, log 342, log 344, and/or any other log) received from the application computing system 330 and/or any other computing system not illustrated herein that may provide logs including data associated with any applications and/or micro-services. In some cases, the databse 340 may be hosted on a computing system as well, such as a server.

The information included within these logs may be formatted in accordance with natural language (for example, the information may be in English or any other language or combination of languages). In some cases, there may be two different types of such logs (however, any other number of different types of logs includes any other types of data may also be applicable). A first type of log may include an access log. The access log may include information relating to identifying users or systems that are accessing the application, as well as other types of information relating to the access. Examples of such information may include a time at which the application was accessed, processing time, a response code that was provided by the application to the user or system, and/or any other types of relevant information. A second type of log may include a developer log. These types of logs may not be standardized or structured, as is the case with the access logs. However, the information within these logs are often also formatted in accordance with natural language.

The one or more edge computing systems, centralized computing system 320, application computing system 330, and/or database 340 as described herein may be configured to communicate via a communications network 350. The communications network 350 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 350 may have any suitable communication range associated therewith and may include, for example, global networks (e.g., the Internet), metropolitan area networks (MANs), wide area networks (WANs), local area networks (LANs), or personal area networks (PANs). In addition, communications network 416 may include any type of medium over which network traffic may be carried including, but not limited to, coaxial cable, twisted-pair wire, optical fiber, a hybrid fiber-coaxial (HFC) medium, microwave terrestrial transceivers, radio frequency communication mediums, white space communication mediums, ultra-high frequency communication mediums, satellite communication mediums, or any combination thereof.

Figure 4:
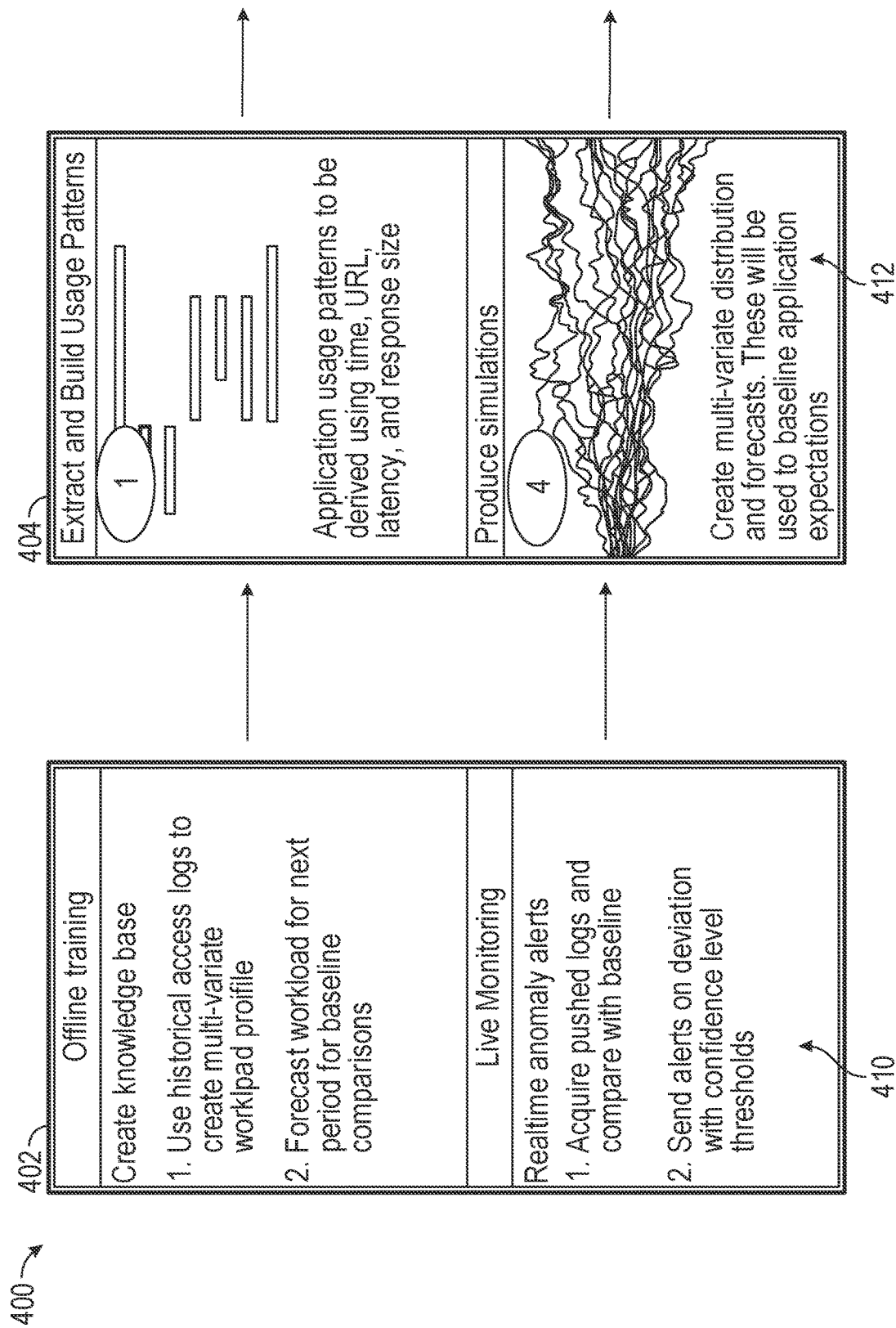
FIG. 4 is an example flow diagram, in accordance with one or more examples of the disclosure.
Figure 4:
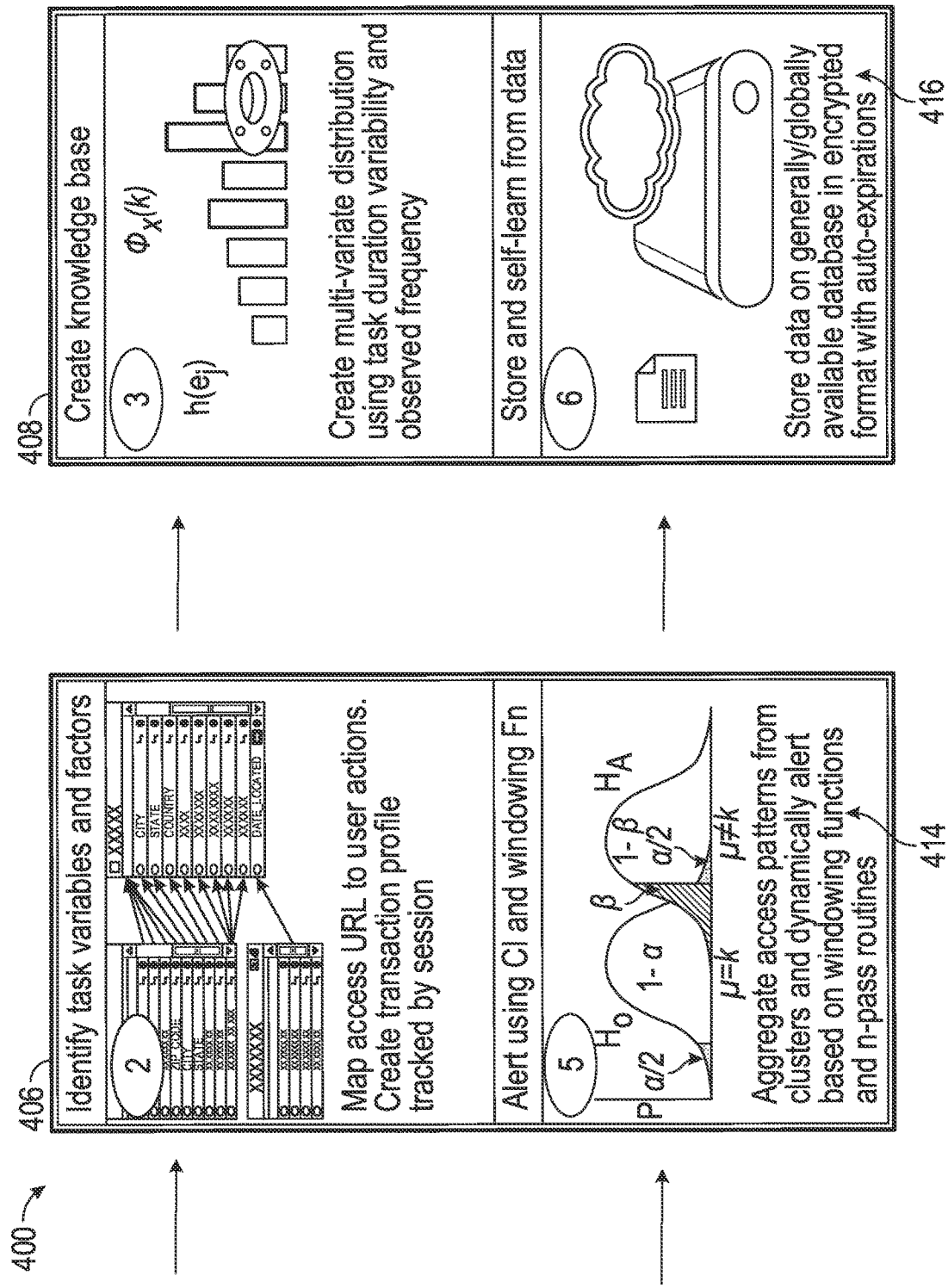

FIG. 4 is an example flow diagram 400, in accordance with one or more examples of the disclosure.

The flow diagram 400 may begin with operations 402-408, which may involve offline training. Operation 402 may involve creating a knowledge base. For example, operation 402 may involve using historical logs to create a multi-variable workload profile. Operation 402 may also involve forecasting a workload for the next period for baseline operations. Operation 404 may involve extracting and building usage patterns. For example, application usage patterns are to be derived using time, URL, latency, and response size. Operation 406 may involve identifying task variables and factors. For example, mapping access URLs to user actions and/or creation transaction profiles tracked by session. Operation 408 may involve creating a knowledge base by creating multi-variate distributions using task duration variability and observed frequency.

Operations 410-416 may involve performing live monitoring of data. Operation 410 may involve performing real-time anomaly alerts. For example, acquiring logs and comparing the data in the logs with any previously-determined baselines (for example, through the offline training of operations 402-408). Additionally, sending alerts when data deviates from the threshold value. Operation 412 may involve producing simulations. For example, creating multi-variable distributions and forecasts. These may be used to baseline application expectations. Operation 414 may involve providing alerts. For example, aggregating access patterns from clusters and dynamically alerting based on windowing functions and n-pass routines. Operation 416 may involve storing data on generally available databases in an encrypted format with automatic expiration times.

Figure 5:
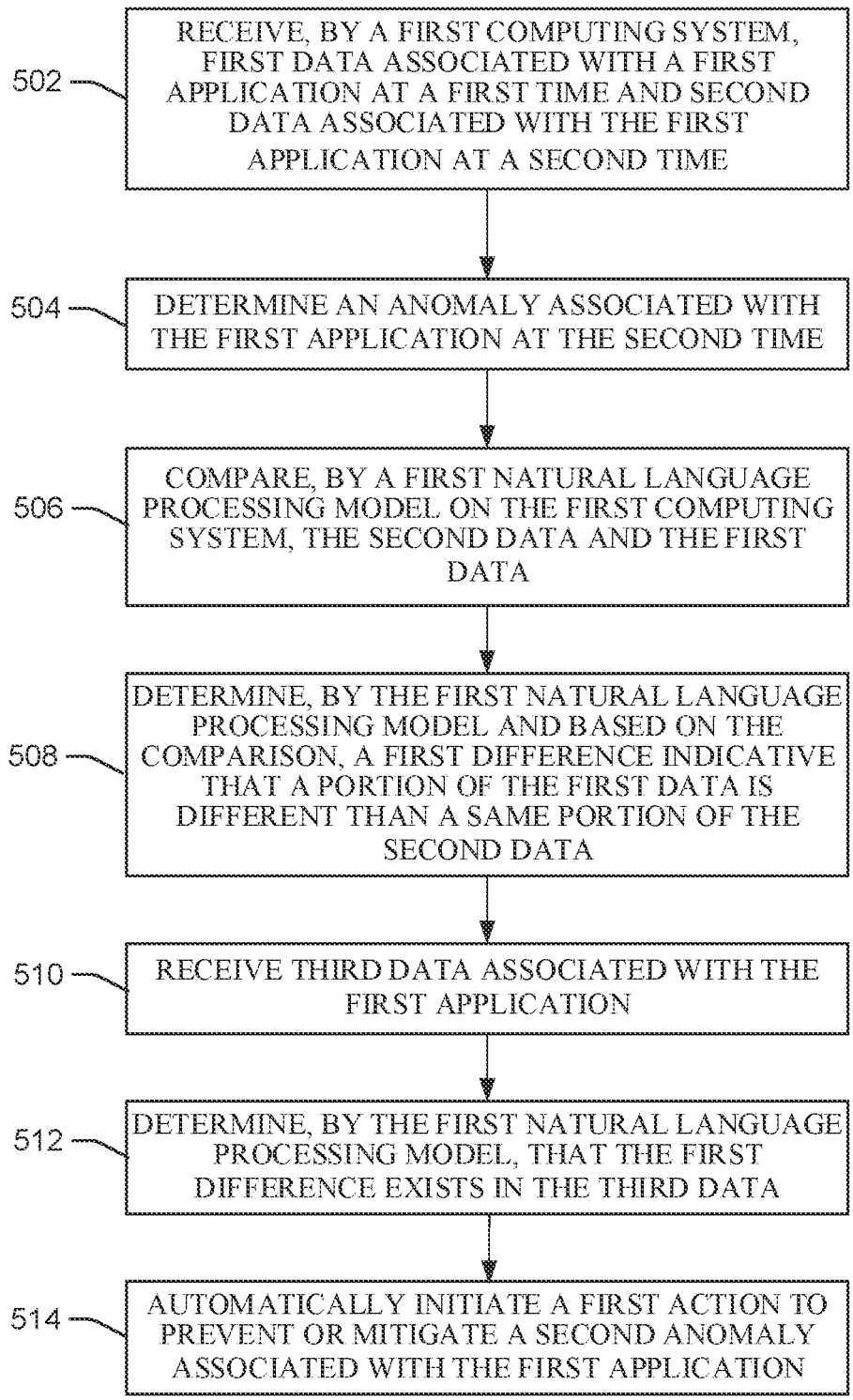
FIG. 5 is an example method, in accordance with one or more embodiments of the disclosure.

In one or more embodiments, FIG. 5 illustrates a method 500 that may be performed by a system or device (such as machine 700 and/or any of the computing systems described herein, for example).

At block 502, the method 500 may include receiving, by a first computing system, first data associated with a first application at a first time and second data associated with the first application at a second time. At block 504, the method may include receiving an indication of an anomaly associated with the first application at the second time. At block 506, the method 500 may include comparing, by a first natural language processing model on the first computing system, the second data, and the first data. At block 508, the method 500 may include determining, by the first natural language processing model and based on the comparison, a first difference indicative that a portion of the first data is different than a same portion of the second data. At block 510, the method 500 may include receiving third data associated with the first application. At block 512, the method 500 may include determining, by the first natural language processing model, that the first difference exists in the third data. At block 514, the method 500 may include automatically initiating a first action to prevent or mitigate a second anomaly associated with the first application In one or more embodiments, determining that the first difference exists in the third data is performed by a second computing system including a second natural language processing model that is based on the first natural language processing model.

In one or more embodiments, the method 500 further comprises training the first natural language processing model based on determining the first difference. The method 500 further comprises updating the second natural language processing model based on the training.

In one or more embodiments, the method 500 further comprises receiving fourth data associated with the first application at the first time, wherein the fourth data is a different type of log than the first data. The method 500 further comprises determining an association between the first data and the fourth data based on the first log and the fourth log being associated with the first time.

In one or more embodiments, the first data, second data, and third data include at least one of: an access log and a developer log.

In one or more embodiments, the method 500 further comprises receiving, by a second computing system, fifth data associated with a second application. The method 500 further comprises determining, by the natural language processing model, that a second difference exists in the fifth data. The method 500 further comprises automatically initiating a second action to prevent or mitigate a third anomaly associated with the second application, wherein determine, by the first computing system, that the first difference exists and determine, by the second computing system, that the second difference exists are performed in parallel.

In one or more embodiments, the first action includes automatically initiating a change to a computing system associated with the first application.

One or more operations of the methods, process flows, or use cases of FIGS. 1-5 may have been described above as being performed by a user device, or more specifically, by one or more program module(s), applications, or the like executing on a device. It should be appreciated, however, that any of the operations of the methods, process flows, or use cases of FIGS. 1-5 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Figure 6:
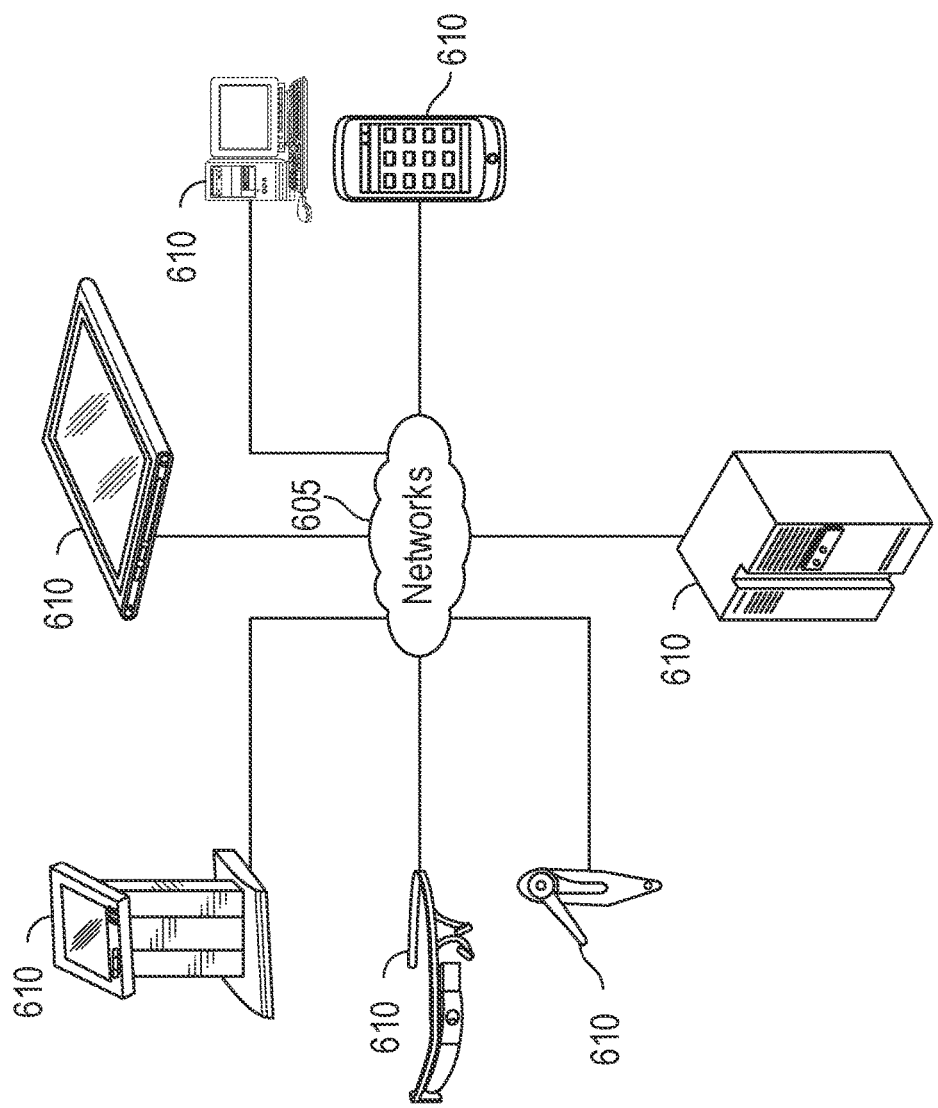
FIG. 6 is an example system, in accordance with one or more embodiments of the disclosure.

FIG. 6 is an example system, in accordance with one or more embodiments of the disclosure.

As is shown in FIG. 6, this particular embodiment may include one or more management computing entities 600, one or more networks 605, and one or more user devices 610. Each one of these components, entities, devices, systems, and similar words used herein interchangeably may be in direct or indirect communication with, for example, one another over the same or different wired or wireless networks. Additionally, while FIG. 6 illustrates the various system entities as separate, standalone entities, the various embodiments are not limited to this particular architecture.

In various aspects, the management computing entities 600 may include various devices or portions of devices on a cable network, including cable modems, optical nodes, to s, active taps, switches, medium access control (MAC) devices, physical layer (PHY) devices, amplifiers, fiber nodes, access points (APs), and the like, variously described below. In another embodiment, such devices may include circuitry (e.g., processors and memory) and associated software instructions (e.g., computer code) to perform various functions associated with such devices (e.g., determine signals for transmission, modulate signals in accordance with one or more modulation techniques, transmit signals including packets, receive including packets, process including packets, schedule including packets, etc.). Moreover, such management computing entities 600 may perform aspects of the transmission of data over networks in accordance with various techniques as described herein.

In another embodiment, the network(s) 605 may include, but not be limited to, cable networks, including hybrid fiber-coaxial networks. More broadly, the network(s) 605 may include at least portions of wireless networks or wired networks. In another embodiment, a cable network may use various sub-networks (e.g., WiFi networks, cellular networks) to perform aspects of the functionality described herein, for example, in connection with the disclosed devices (e.g., switches, taps, active taps, MAC devices, cable modem termination system (CMTS) devices, PHY devices, amplifiers, optical fiber nodes, access points and the like). In another embodiment, the networks 605 may use at least a portion of fifth-generation cellular mobile communications, also referred to as 5G herein.

In another embodiment, the user devices 610 can include devices associated with a customer premises equipment (e.g., devices located in a dwelling of a user or on the person of a user). Non-limiting examples may include one or more computers, computing entities, desktop computers, mobile phones, tablets, phablets, notebooks, laptops, distributed systems, gaming consoles (for example, Xbox, Play Station, Wii), watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

Figure 7:
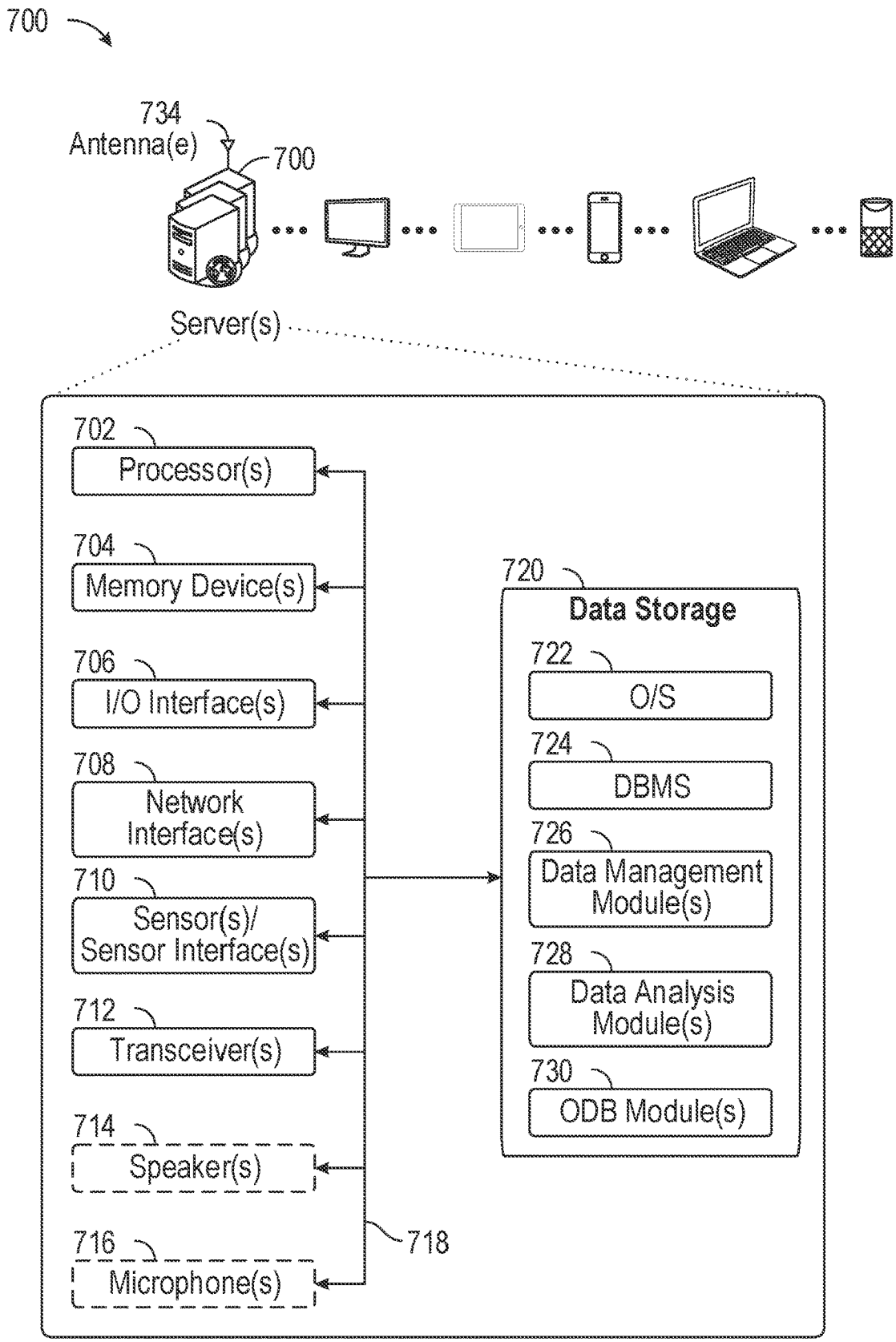
FIG. 7 is an example system, in accordance with one or more embodiments of the disclosure.

FIG. 7 is a schematic block diagram of one or more illustrative server(s) 700 in accordance with one or more example embodiments of the disclosure. The server(s) 700 may include any suitable computing device including, but not limited to, a server system, a mobile device such as a smartphone, a tablet, an e-reader, a wearable device, or the like; a desktop computer; a laptop computer; a content streaming device; a set-top box; or the like. The server(s) 700 may correspond to an illustrative device configuration for any of the computing systems described herein and/or any other system and/or device.

The server(s) 700 may be configured to communicate via one or more networks with one or more servers, user devices, or the like. The server(s) 700 may be configured to receive data from one or more onboard diagnostic tools, analyze the data, provide the data via an interface to one or more entities, and/or generate alerts based on the data and predetermined rules.

The server(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server(s) 700 may include one or more processors (processor(s)) 702, one or more memory devices 704 (generically referred to herein as memory 704), one or more input/output (I/O) interfaces 706, one or more network interfaces 708, one or more sensors or sensor interfaces 710, one or more transceivers 712, one or more optional speakers 714, one or more optional microphones 716, and data storage 720. The server(s) 700 may further include one or more buses 718 that functionally couple various components of the server(s) 700. The server(s) 700 may further include one or more antenna(e) 734 that may include, without limitation, a cellular antenna for transmitting or receiving signals to/from a cellular network infrastructure, an antenna for transmitting or receiving WiFi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus. It may permit the exchange of information (e.g., data (including computer-executable code), signaling, etc.) between various components of the server(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the server(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory, such as a data cache, may be a multi-level cache organized as a hierarchy of one or more cache levels (L1, L2, etc.).

The data storage 720 may include removable storage and/or non-removable storage, including, but not limited to, magnetic storage, optical disk storage, and/or tape storage.

The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMSs) 724; and one or more program module(s), applications, engines, computer-executable code, scripts, or the like such as, for example, one or more data management module(s) 726, one or more data analysis module(s) 728, and/or one or more OBD module(s) 730. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the server(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, an example datastore(s) may include, for example, web content, advertisement campaigns, advertisements, content items, and/or other information.

The processor(s) 702 may be configured to access the memory 704 and execute the computer-executable instructions loaded therein. For example, the processor(s) 702 may be configured to execute the computer-executable instructions of the various program module(s), applications, engines, or the like of the server(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a reduced instruction set computer (RISC) microprocessor, a complex instruction set computer (CISC) microprocessor, a microcontroller, an application-specific integrated circuit (ASIC), a field-programmable gate array (FPGA), a system-on-a-chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the data management module(s) 726 may include computer-executable instructions, code, or the like that are responsive to execution by one or more of the processor(s) 702 may perform functions including, but not limited to, receiving and transmitting data to OBD tools, asset management personnel, management entities, financial entities, and the like.

The data analysis module(s) 728 may include computer-executable instructions, code, or the like that are responsive to execution by one or more of the processor(s) 702 may perform functions including, but not limited to, translating and analyzing data received from OBD tools and other sources. The data may be analyzed using machine-learning techniques and other data analysis mechanisms that may provide insight into the data obtained from the OBD tools.

The OBD module(s) 730 may include computer-executable instructions, code, or the like that are responsive to execution by one or more of the processor(s) 702 may perform functions including, but not limited to, communicating with OBD tools, transmitting instructions, and managing firmware updates for the OBD tools.

Referring now to other illustrative components depicted as being stored in the data storage 720, the 0/S 722 may be loaded from the data storage 720 into the memory 704. It may provide an interface between other application software executing on the server(s) 700 and the hardware resources of the server(s) 700. More specifically, the 0/S 722 may include a set of computer-executable instructions for managing hardware resources of the server(s) 700 and for providing common services to other application programs (e.g., managing memory allocation among various application programs). In certain example embodiments, the 0/S 722 may control the execution of the other program module(s) to dynamically enhance characters for content rendering. The O/S 722 may include any operating system now known or which may be developed in the future, including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the server(s) 700 is a mobile device, the DBMS 724 may be any suitable lightweight DBMS optimized for performance on a mobile device.

Referring now to other illustrative components of the server(s) 700, the input/output (I/O) interface(s) 706 may facilitate the receipt of input information by the server(s) 700 from one or more I/O devices as well as the output of information from the server(s) 700 to one or more I/O devices. The I/O devices may include any of a variety of components, such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the server(s) 700 or may be separate. The I/O devices may further include, for example, any number of peripheral devices such as data storage devices, printing devices, and so forth.

The I/O interface(s) 706 may also include an interface for an external peripheral device connection such as a universal serial bus (USB), FireWire, Thunderbolt, Ethernet port or other connection protocol that may connect to one or more networks. The I/O interface(s) 706 may also include a connection to one or more of the antenna(e) 734 to connect to one or more networks via a wireless local area network (WLAN) (such as WiFi) radio, Bluetooth, ZigBee, and/or a wireless network radio, such as a radio capable of communication with a wireless communication network such as a Long Term Evolution (LTE) network, WiMAX network, 3G network, etc.

The server(s) 700 may further include one or more network interface(s) 708 via which the server(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(e) 734 may include any suitable type of antenna depending, for example, on the communications protocols used to transmit or receive signals via the antenna (e) 734. Non-limiting examples of suitable antennae may include directional antennae, non-directional antennae, dipole antennae, folded dipole antennae, patch antennae, multiple-input multiple-output (MIMO) antennae, or the like. The antenna(e) 734 may be communicatively coupled to one or more transceivers 712 or radio components to which or from which signals may be transmitted or received.

As previously described, the antenna(e) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 734 may additionally, or alternatively, include a WiFi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 734 may be configured to transmit or receive radio frequency signals within any suitable frequency range, forming part of the unlicensed portion of the radio spectrum.

The antenna(e) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(e) 734—transmitting or receiving radio frequency (RF) signals in the bandwidth and/or channels corresponding to the communications protocols utilized by the server(s) 700 to communicate with other devices. The transceiver(s) 712 may include hardware, software, and/or firmware for modulating, transmitting, or receiving—potentially in cooperation with any of antenna(e) 734—communications signals according to any of the communications protocols discussed above including, but not limited to, one or more WiFi and/or WiFi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the server(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device, such as, for example, inertial sensors, force sensors, thermal sensors, and so forth. Example types of inertial sensors may include accelerometers (e.g., MEMS-based accelerometers), gyroscopes, and so forth.

The speaker(s) 714 may be any device configured to generate audible sound. The microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), application programming interface(s) (API(s)), or any other suitable computer-executable code hosted locally on the server(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently, such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the server(s) 700 may include alternate and/or additional hardware, software, or firmware components beyond those described or depicted without departing from the scope of the disclosure. More particularly, it should be appreciated that software, firmware, or hardware components depicted as forming part of the server(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-11 may be performed by a device having the illustrative configuration depicted in FIG. 7, or more specifically, by one or more engines, program module(s), applications, or the like executable on such a device. It should be appreciated, however, that such operations may be implemented in connection with numerous other device configurations.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/ or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components, including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language, such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software components without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines, and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system comprising:
    a processor; and
    a memory storing computer-executable instructions that, when executed by the processor, cause the processor to:
    receive, by one or more computing systems, first data associated with a first application at a first time and second data associated with the first application at a second time;
    determine a first anomaly associated with the first application at the second time;
    compare, by a first natural language processing model on the one or more computing systems, the second data and the first data;
    determine, by the first natural language processing model and based on the comparison, a first difference indicative that a portion of the first data is different than a same portion of the second data;
    receive third data associated with the first application;
    receive fourth data associated with a second application;
    determine, by the first natural language processing model and in parallel, that the first difference exists in the third data and that a second difference exists in the fourth data; and
    automatically initiate a first action to prevent or mitigate a second anomaly associated with the first application and a second action to prevent or mitigate a third anomaly associated with the second application.

2. The system of claim 1, wherein determining that the first difference exists in the third data is performed by a second natural language processing model that is based on the first natural language processing model.

3. The system of claim 2, wherein the computer-executable instructions further cause the processor to:
    train the first natural language processing model based on determining the first difference; and
    update the second natural language processing model based on the training.

4. The system of claim 1, wherein the computer-executable instructions further cause the processor to:
    receive fifth data associated with the first application at the first time, wherein the fifth data is a different type of data than the first data; and
    determine an association between the first data and the fifth data based on the first data and the fifth data being associated with the first time.

5. The system of claim 1, wherein the first data, second data, and third data, and fourth data include at least one of: an access log and a developer log.

6. The system of claim 1, wherein the first action includes automatically initiating a change to a computing system associated with the first application.

7. A method comprising;
    receiving, by one or more computing systems, first data associated with a first application at a first time and second data associated with the first application at a second time;
    determining a first anomaly associated with the first application at the second time;
    comparing, by a first natural language processing model on the one or more computing systems, the second data and the first data;
    determining, by the first natural language processing model and based on the comparison, a first difference indicative that a portion of the first data is different than a same portion of the second data;

receiving third data associated with the first application;

receiving fourth data associated with a second application;

determining, by the first natural language processing model and in parallel, that the first difference exists in the third data and that a second difference exists in the fourth data; and automatically initiating a first action to prevent or mitigate a second anomaly associated with the first application and a second action to prevent or mitigate a third anomaly associated with the second application.

8. The method of claim 7, wherein determining that the first difference exists in the third data is performed by a second natural language processing model that is based on the first natural language processing model.

9. The method of claim 8, further comprising:

training the first natural language processing model based on determining the first difference; and updating the second natural language processing model based on the training.

10. The method of claim 7, further comprising:

receiving fifth data associated with the first application at the first time, wherein the fifth data is a different type of data than the first data; and determining an association between the first data and the fifth data based on the first data and the fifth data being associated with the first time.

11. The method of claim 7, wherein the first data, second data, third data, and fourth data include at least one of: an access log and a developer log.

12. The method of claim 7, wherein the first action includes automatically initiating a change to a computing system associated with the first application.

13. A non-transitory computer-readable medium storing computer-executable instructions that, when executed by a processor, cause the processor to:

receive, by one or more computing systems, first data associated with a first application at a first time and second data associated with the first application at a second time;

determine a first anomaly associated with the first application at the second time;

compare, by a first natural language processing model on the one or more computing systems, the second data and the first data;

determine, by the first natural language processing model and based on the comparison, a first difference indicative that a portion of the first data is different than a same portion of the second data;

receive third data associated with the first application;

receive fourth data associated with a second application;

determine, by the first natural language processing model and in parallel, that the first difference exists in the third data and that a second difference exists in the fourth data; and automatically initiate a first action to prevent or mitigate a second anomaly associated with the first application and a second action to prevent or mitigate a third anomaly associated with the second application.

14. The non-transitory computer-readable medium of claim 13, wherein determining that the first difference exists in the third data is performed by a second natural language processing model that is based on the first natural language processing model.

15. The non-transitory computer-readable medium of claim 14, wherein the computer-executable instructions further cause the processor to:

train the first natural language processing model based on determining the first difference; and update the second natural language processing model based on the training.

16. The non-transitory computer-readable medium of claim 13, wherein the computer-executable instructions further cause the processor to:

receive fifth data associated with the first application at the first time, wherein the fifth data is a different type of data than the first data; and determine an association between the first data and the fifth data based on the first data and the fifth data being associated with the first time.

17. The non-transitory computer-readable medium of claim 13, wherein the first data, second data, third data, and fourth data include at least one of: an access log and a developer log.

* * * * *